March 17, 1959 G. A. GAXIOLA 2,877,558
GROOVE GAGE
Filed July 27, 1953
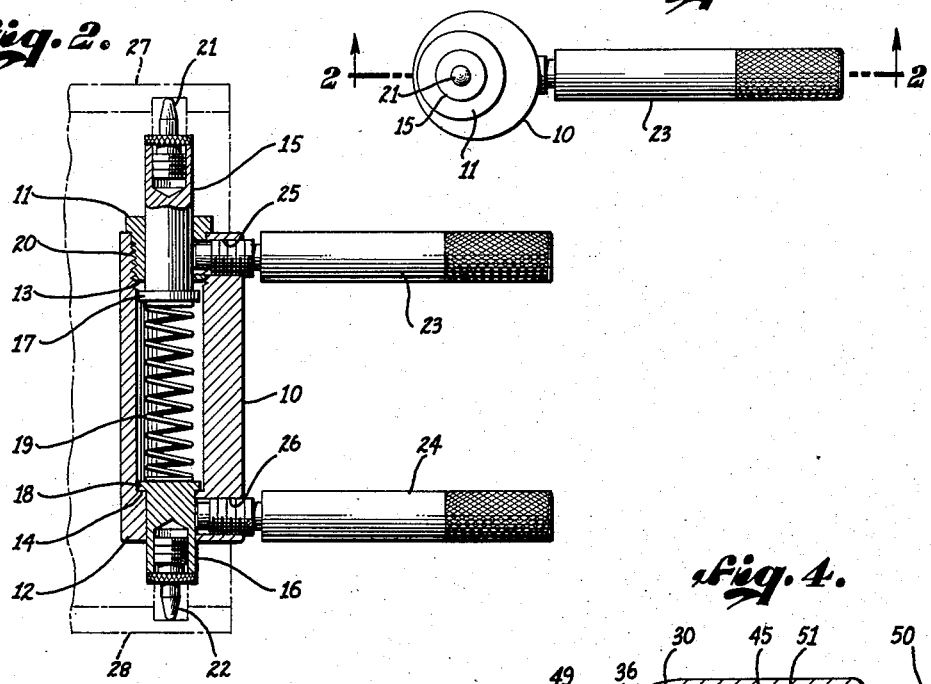
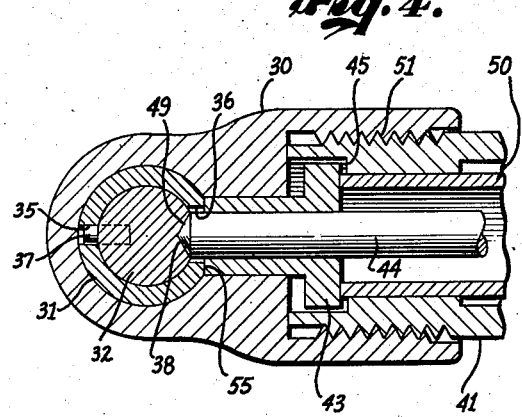
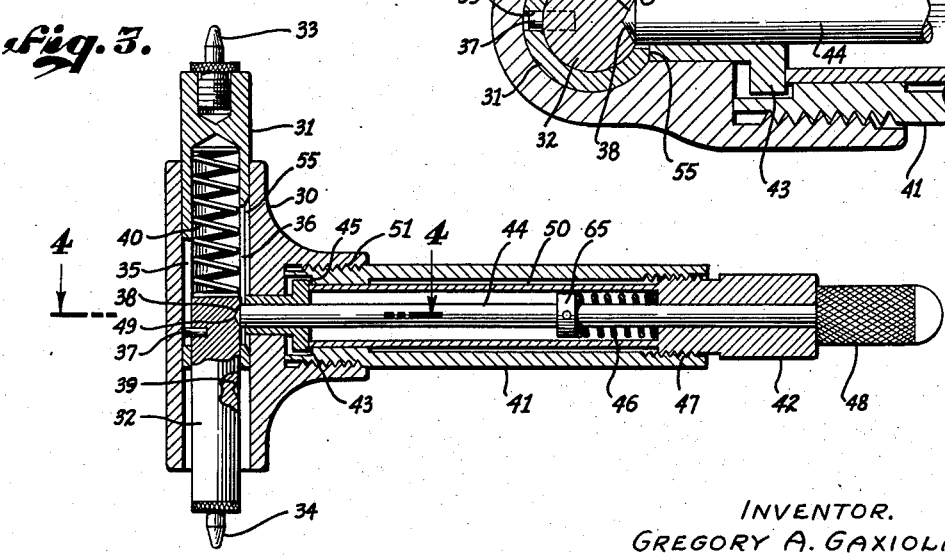
INVENTOR.
GREGORY A. GAXIOLA
BY HIS ATTORNEYS.
HARRIS, KIECH, FOSTER & HARRIS

2,877,558

GROOVE GAGE

Gregory A. Gaxiola, San Fernando, Calif.

Application July 27, 1953, Serial No. 370,525

1 Claim. (Cl. 33—143)

The present invention refers to a new and improved type of groove gage which can be easily and conveniently used for measuring the distance between internal surfaces.

Internal groove gages as a class are, of course, generally known at the present time. A great many constructions of this type have been suggested in the past. Most of these constructions are unacceptable for one reason or another. Frequently, the accuracy of the prior devices has been such as to prevent their use with very fine work. If the accuracy of the prior groove gages has been acceptable, as a general rule these gages have been so complicated and hence so expensive that they were removed from the buying power of the average skilled worker.

It is an object of the present invention to produce a new and improved type of groove gage which is extremely accurate. A further object is to produce a gage of the class described which can be easily and conveniently used and which can be cheaply manufactured. Other objects of the invention, as well as the advantages of it, will be apparent from the balance of this specification, including the claim, and the accompanying drawing, in which:

Fig. 1 shows a top view of the groove gage of the present invention;

Fig. 2 shows a partially sectional view of the gage pictured in Fig. 1 taken at line 2—2;

Fig. 3 shows a sectional view similar to Fig. 2 of a modified groove gage of the invention; and Fig. 4 illustrates in cross section an enlarged portion of the groove gage of Fig. 3 taken at line 4—4.

Briefly, the above aims of the invention are achieved by forming a groove gage consisting of a hollow, tubular housing in which there are positioned at opposed extremities plungers equipped with gaging points, these plungers being held apart from one another by a single spring element. Appropriate means are provided to hold these plungers in any fixed position; further, one of them must be capable of returning to a given position after being depressed within the tubular housing.

Perhaps the invention will be best described with reference to the accompanying drawing. Here in Figs. 1 and 2 there is shown a new gage, of the present invention, as consisting of a tubular housing 10 provided with an end cap 11 attached to the housing 10 as by a screw joint 20 so as to provide an internal shoulder 13. A second end cap 12 is positioned at the other extremity of the housing 10 so as to provide an internal shoulder 14. This second cap preferably forms an integral part of the housing 10 although it can be manufactured in other manners. A first plunger 15 is placed within the housing 10 so that it slides in a bore of the end cap 11. It is provided with an internal shoulder 17 adapted to rest against the internal shoulder 13 so as to limit its motion externally of the housing 10. A second plunger 16 having a shoulder 18 slides within a bore of the end cap 12 of the device so as to be normally biased against the internal shoulder 14. The two plungers 15 and 16 are normally urged apart by means of a spring 19 within the housing 10 and compressed between the plungers 15 and 16.

Both of the plungers 15 and 16 are internally threaded and are provided with gaging points 21 and 22, respectively. Inasmuch as these points are threaded within the plungers, they can be readily replaced with longer or shorter points, thus enabling the device to be used for measuring a variety of different inside dimensions. Such other points can be carried as parts of the handles 23 and 24 for the entire gage. These handles are attached to the housing 10 by means of tapped holes 25 and 26, respectively, so as to bear against the plungers 15 and 16 at the end caps 11 and 12, respectively. By tightening either of the handles 23 or 24 sufficiently, it is possible to prevent further motion of the plungers.

In using the device, the handle 24 is first loosened, allowing the plunger 16 to fit against the shoulder 14. Then this handle 24 is tightened, fixing the plunger 16 in position. Next the handle 23 is loosened; the plunger 15 is compressed to an extent sufficient to fit within walls 27 and 28 being measured; and the handle 23 is tightened locking the plunger 15 in place and the entire device is inserted within these walls. The handle 23 is then loosened allowing the plunger 15 to intersect the wall 27, while at the same time the plunger 16 is held in contact with the wall 28. Following this, the handle 23 is tightened against the plunger 15 and the handle 24 is loosened. The plunger 16 is then compressed by moving the entire device against the wall 28, and is held in this contracted position by tightening the handle 24 while the entire device is removed from the walls 27 and 28. The handle 24 is then loosened, allowing the plunger 16 to revert to its former position against the shoulder 14 and then the handle 24 tightened. At this point the distance between the ends of the gaging points 21 and 22 can be measured using conventional means such as, for example, a micrometer.

A modified device, shown in Figs. 3 and 4 of the drawing, differs from the device shown in Figs. 1 and 2 primarily in that a single handle is employed to govern the operation of the pointer rather than two handles. This construction, as shown, consists essentially of a tubular body housing 30 into which there is fitted a first hollow plunger 31 which in turn carries internally a second plunger 32 projecting outside of the housing 30. Both of these plungers are fitted with gaging points 33 and 34 in the manner specified above. The plunger 31 is provided with slots 35 and 36 in opposed side walls. The slot 35 carries a pin 37 attached to the plunger 32 so as to limit movement of the two plungers with respect to one another. The portion of the plunger 32 adjacent the slot 36 is fitted with a plurality of depressions 38 and 39 for a purpose that will be more fully explained later. The two plungers are urged apart by means of a body spring 40 positioned internally between them.

A hollow tubular handle 41 of the device may be detachably connected to the body portion in any convenient manner such as, for example, by screw threads 51. It provides a first plunger-locking means including at its outer end a knurled guide cap 42 connected to a barrel portion 50 engaging at its inner end a positioning cap 43. A shoulder 45 positioned internally within the handle 41 limits the motion of the cap 43 so that a forward portion of this cap always projects within the flat keyway 55 on the plunger 31, preventing the plungers 31 and 32 from moving externally of the device and pressing against the keyway walls to clamp the first plunger 31 in selected position. Both of these caps, as well as the barrel portion, are traversed by a pointed shaft 44 forming a part of a second plunger-locking means. This shaft terminates externally of the device in a knurled handle 48 and internally of the device in a point 49 corresponding in size and shape to the depressions 39 and 38. Midway in the barrel 50 there is provided a fixed collar 65 on the shaft 44 between which and the guide cap 42 there is provided a spring 46 tending normally to urge the shaft 44 against the plunger 32. The inner positioning cap 43 is normally held against the plunger 31 by the barrel 50 which in turn is connected to the guide cap 42. This guide cap 42 is connected to the handle 41 by screw threads 47.

In operating the modified device shown in Figs. 3 and 4, the point 49 of the shaft 44 is inserted in the depression 38, the plunger 31 is pressed downwardly and the cap 42 is tightened fixing the cap 43 against the plunger 31. The device is next inserted internally of whatever is being measured. The cap 42 is then unscrewed so as to allow the plunger 31 to expand against the wall being measured. Then the knurled cap 42 is again tightened and the shaft 44 is withdrawn from the depression 38 by pulling on the handle 48 and pressing the gage down so that the small plunger 32 can be depressed far enough to allow the shaft 44 to be inserted into the depression 39 for removal of the entire device from the cavity or groove being measured. The shaft and the small plunger are finally allowed to resume their former positions with the point 49 fitting within the depression 38 and the distance between the two gaging points is measured as before.

It will be readily realized by those skilled in the art that the herein described and disclosed invention is capable of a variety of modifications. Such modifications, in so far as they are defined by the appended claim, are to be considered as part of the present inventive concept.

I claim as my invention:

A groove gage including in combination: a tubular housing having a longitudinal cavity; end caps at opposite ends of said housing, said end caps respectively providing shoulders facing said cavity and bores coaxial with the axis of said cavity; two plungers respectively slidable in said bores and providing shoulders engageable with the shoulders of said end caps to limit the outward movement of said plungers relative to said housing, said plungers providing inner surfaces facing each other in said cavity; a compression spring compressed between said plungers and having opposed ends exerting pressure on said inner surfaces to bias said plungers outwardly of said housing, said plungers providing groove-engaging gaging surfaces outside said housing; and handles extending side-by-side from said housing and threaded thereto, said handles providing inner portions respectively exerting a clamping pressure on said plungers when turned relative to said housing.

References Cited in the file of this patent

UNITED STATES PATENTS

| | | |
|---|---|---|
| 1,655,133 | Clase | Jan. 3, 1928 |
| 1,671,168 | Steinle | May 29, 1928 |
| 1,860,640 | Witchger | May 31, 1932 |
| 2,352,313 | Fernwald | June 27, 1944 |
| 2,746,156 | Reed | May 22, 1956 |

OTHER REFERENCES

Article in American Machinist, page 112, June 26, 1950.